United States Patent
White et al.

[11] Patent Number: 5,980,854
[45] Date of Patent: Nov. 9, 1999

[54] METHOD FOR THE PRODUCTION OF A MAGNESIUM CHLORIDE SOLUTION

[75] Inventors: Carl White, Montreal; Michel Bérubé, St-Lambert, both of Canada

[73] Assignee: Noranda, Inc., Toronto, Canada

[21] Appl. No.: 09/158,607

[22] Filed: Sep. 23, 1998

[51] Int. Cl.[6] ...................................................... C01F 5/30
[52] U.S. Cl. ........................ 423/497; 423/163; 423/158; 423/167.1
[58] Field of Search .................... 423/497, 163, 423/167.1, 158

[56] References Cited

U.S. PATENT DOCUMENTS

| 2,384,009 | 9/1945 | Brandenburg | 423/163 |
| 3,729,550 | 4/1973 | Boyum et al. | 423/497 |
| 4,100,254 | 7/1978 | Grohmann et al. | 423/163 |
| 4,200,618 | 4/1980 | Pitts | 423/163 |
| 4,800,003 | 1/1989 | Peacey et al. | 205/404 |
| 4,944,928 | 7/1990 | Grill et al. | 423/161 |
| 5,091,161 | 2/1992 | Harris et al. | 423/163 |
| 5,112,584 | 5/1992 | Mejdell et al. | 423/161 |
| 5,120,514 | 6/1992 | Tveten et al. | 423/155 |

FOREIGN PATENT DOCUMENTS

| 88/10236 | 12/1988 | WIPO | 423/158 |

*Primary Examiner*—Ngoc-Yen Nguyen
*Attorney, Agent, or Firm*—Fitzpatrick, Cella, Harper & Scinto

[57] ABSTRACT

The present invention is concerned with a method for the extraction of magnesium from magnesium-containing materials such as magnesite, dolomite and silicates materials like serpentine residues, products from the amphibole or pyroxene group. The magnesium-containing material is first leached in at least one leaching reactor, and subsequently submitted to a series of neutralizing steps in separate reactors under controlled pH and oxydo-reduction potentials. The slurry produced is filtered to produce a substantially pure magnesium chloride solution containing less than 1 ppm of each contaminant present therein.

11 Claims, 1 Drawing Sheet

Figure 1: Leach and Neutralization Circuit
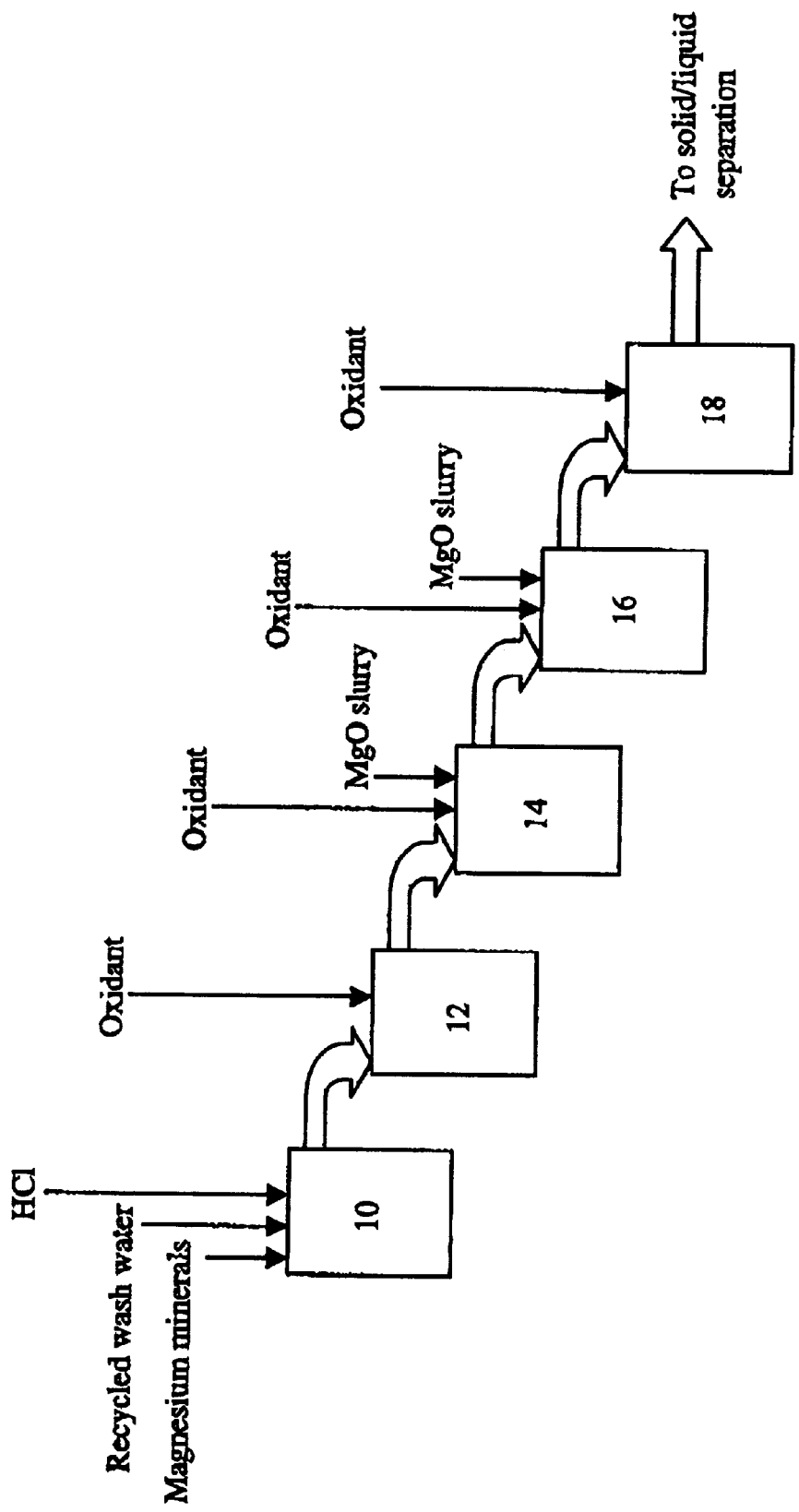

METHOD FOR THE PRODUCTION OF A MAGNESIUM CHLORIDE SOLUTION

FIELD OF THE INVENTION

The present invention relates to an improved method for the extraction of magnesium from magnesium-containing materials to produce a concentrated magnesium chloride solution, i.e., a brine, suitable for the production of pure magnesium metal via the electrolysis of molten magnesium chloride in electrolytic cells. The method allows the production of a high purity solution from various primary source materials containing magnesium, such as siliceous, carbonaceous or metallic oxide materials.

BACKGROUND OF THE INVENTION

Magnesium is the eighth most abundant element in the earth's crust although not found in its elemental form. It is a lightweight material of choice because it is one third lighter than aluminum and it has the highest strength-to-weight ratio of any of the commonly used metals. Magnesium is also approximately one-quarter the density of steel and zinc, and has a number of advantageous performance characteristics, including impact resistance and vibration damping capability compared with other competing materials. In addition, die casting of magnesium offers many design and process advantages which augment magnesium's economic attractiveness as a lightweight material.

Magnesium metal is conventionally obtained from electrolysis of anhydrous molten magnesium chloride in a sealed cell. One of the key challenges of producing magnesium metal is not so much the electrolysis process itself than the treatment and conditioning of the starting material containing the magnesium to produce magnesium chloride sufficiently pure to be subsequently electrolyzed.

Conventional methods of generating magnesium chloride solutions or brines include the evaporation of water from salt lake water or seawater. Such process is costly because of the huge amount of water required, magnesium being present therein only in low concentration, typically less than 0.2%, with the exception of the Dead Sea, which contains about 3.5% of magnesium.

Serpentine, commonly known as asbestos tailings, contains a significant amount of magnesium therein, generally from about 20 to 25% by weight. However, these tailings also contain silica and quartz derivatives as major components, and many processes for extracting magnesium from serpentine have been confronted with the generation of silica gel or other siliceous residues that are difficult to filter, thus significantly hindering the recovery of magnesium.

Several processes have been published for magnesium extraction from serpentine or other siliceous bearing materials, but they all require stringent and difficult experimental conditions, and the resulting magnesium chloride solution still contains significant amounts of impurities that must be removed before being considered as a feed material suitable for a magnesium electrolysis cell.

Recently, a new method for the production of a magnesium chloride solution from siliceous materials has been proposed in U.S. Pat. No. 5,091,161. The method involves leaching the siliceous material in a first reactor with a hydrochloric acid solution at a pH lower than 1.5 and a temperature higher than 50° C. to prevent the formation of silica gel (leach step). The leaching can be carried out in a continuous manner when the siliceous material is fed continuously in the reactor. The leaching solution is continuously transferred in a second reactor wherein magnesia is added continuously to raise the pH to 4–7 and precipitate the bulk of the impurities from the solution, still without forming silica gel in the reactive medium (neutralization step), and a solid/liquid separation is performed thereafter. Subsequently, caustic soda is added to increase the pH to 6–7, (purification step), and a further solid/liquid separation is performed. Chlorine gas is sparged through the slurry prior the addition of caustic soda to oxidize any remaining iron to the ferric state and most of the manganese to solid magnesium dioxide. At this stage, minor elements such as manganese, nickel and boron still remain in solution. These impurities must all be removed since they are highly detrimental to the magnesium chloride electrolysis process. Therefore, a last purification step is required to obtain a sufficiently pure magnesium chloride solution. This is achieved by passing the solution in an ion-exchange column to remove these impurities.

Although the process of this patent is a significant step forward over those known previously for extracting magnesium from siliceous materials, there is still room for improvement. For example, ion-exchange columns are extremely costly to install and maintain, because of the necessity to either regenerate the resin regularly, or systematically replace it. Further, such columns are likely to represent a major bottleneck to the overall production of magnesium because of the limited throughput that it can accept.

There is therefore a great need to develop a method for the extraction of magnesium from magnesium-containing materials not suffering from the drawbacks mentioned above.

SUMMARY OF THE INVENTION

In accordance with the present invention, there is now provided a method for the extraction of magnesium from a magnesium-containing material to produce a substantially pure magnesium chloride solution. More specifically, the method comprises the steps of:

a) feeding the magnesium-containing material and hydrochloric acid in a first leaching reactor to produce a slurry wherein magnesium solubilizes in the form of magnesium chloride, the magnesium-containing material and the hydrochloric acid being fed at a rate such that an excess of acid is maintained in the slurry solution, the temperature in the reactor being maintained sufficiently high to initiate an autogenous reaction solubilizing the magnesium;

b) carrying a first neutralization stage by transferring the slurry in a first neutralization reactor wherein the pH is raised between substantially 0.5 and substantially 3.5 under a positive potential;

c) carrying a second neutralization stage by transferring the slurry in a second neutralization reactor wherein the pH is raised between substantially 4.0 and substantially 5.5 while maintaining a potential between substantially −300 mV and substantially +300 mV;

d) carrying a third neutralization stage by transferring the slurry in a third neutralization reactor wherein the potential is raised at a value higher than +450 mV; and e) submitting the slurry produced after step d) to a solid/liquid separation step to recover a substantially pure magnesium chloride solution containing 1 ppm or less of each contaminant present therein.

In a preferred embodiment, in step b) the potential is maintained between substantially +0 and substantially +350 mV to precipitate the iron. In a further preferred embodiment, the magnesium-containing material is serpentine.

IN THE DRAWINGS

FIG. 1 illustrates a flow chart of a preferred embodiment of the present method.

DETAILED DESCRIPTION OF THE INVENTION

The present invention is directed to a method for the extraction of magnesium from magnesium-containing materials such as magnesite, dolomite, magnesium-containing silicates and their oxides. An important source of magnesium-containing silicates is serpentine, which is a magnesium iron silicate hydroxide generally containing between 20 and 25% by weight of magnesium. Serpentine is actually a general name applied to various minerals of a polymorphic group. These minerals have essentially the same chemistry but different structures. Examples of such minerals are:

Antigorite; $(Mg,Fe)_3Si_2O_5(OH)_4$   Lizardite; $Mg_3Si_2O_5(OH)_4$
Clinochrysotile; $Mg_3Si_2O_5(OH)_4$   Orthochrysotile; $Mg_3Si_2O_5(OH)_4$
Parachrysotile; $(Mg,Fe)_3Si_2O_5(OH)_4$ Other silicates include amphibole minerals, which are inosilicates of the general formula $$(X, Y, Z)_{7-8}(Al, Si)_2Si_6O_{22}(OH)_2$$

wherein "X" stands for calcium, sodium, lead and in only minor amounts, potassium. They can be present as $X_2$, $X_3$ or not present at all. The "Y" stands for ions of iron (ferrous), lithium, manganese (+2) and magnesium. "Z" stands for ions such as iron (ferric), chromium (+3), aluminum and in small amounts, titanium. The most common minerals of the amphibole group include:
actinolite (calcium magnesium iron silicate hydroxide);
arfvedsonite (sodium iron magnesium silicate hydroxide);
anthophyllite (magnesium iron silicate hydroxide);
cummingtonite (iron magnesium silicate hydroxide);
edenite (sodium calcium magnesium iron aluminium silicate hydroxide);
fluorrichterite (calcium sodium magnesium iron aluminium silicate hydroxide fluoride);
hornblend (calcium sodium magnesium iron aluminium silicate hydroxide);
richterite (sodium calcium magnesium iron silicate hydroxide); and
tremolite (calcium magnesium iron silicate hydroxide);

Other silicate compounds that can be used as a primary source of magnesium in the present method are pyroxene minerals, which are also inosilicates, with the general formula $$XY(Al, Si)_2O_6$$

wherein "X" stands for calcium, sodium, zinc and lithium; "Y" stands for chromium, aluminum, iron (+3), titanium and vanadium. Other metallic ions such as iron (+2), magnesium and manganese can be included in either the "X" or "Y" definitions, or both. The most common minerals of the pyroxene group include
augite (calcium sodium magnesium iron aluminum silicate);
diopside (calcium magnesium silicate);
hypersthene (magnesium iron silicate);
kanoite (manganese magnesium silicate);
pigeonite (calcium magnesium iron silicate); and
enstatite (magnesium silicate);

Oxides of any of the above materials may also be advantageously used as a primary source of magnesium for the method of the present invention.

It has unexpectedly been found that pursuant to the leaching of the magnesium-containing material with HCl either added aqueous, gaseous or both, a magnesium chloride solution containing less than 1 ppm of each metal impurities present therein can be obtained by controlling the pH and the potential of the slurry during a series of neutralization steps in separate reactors. Accordingly, it is no longer necessary to further purify the solution by ion exchange. The substantially pure magnesium chloride solution is recovered thereafter by a simple solid/liquid separation.

In the leaching step, the magnesium-containing material is leached in a first reactor by feeding the magnesium-containing material and hydrochloric acid at a rate such that there is constantly an excess of free acid in the solution. If the HCl is added in the form of a solution, the concentration in the solution is preferably between 20 and 36% w/w. If the HCl is added in a gaseous form, the magnesium-containing material must be mixed with water prior to the HCl addition in the leaching reactor. The temperature of the slurry in the leaching reactor is maintained sufficiently high to initiate an autogenous reaction that will effectively solubilize the magnesium in the form of magnesium chloride. The magnesium chloride is then dried before being used in the electrolysis process. The HCl solution remaining thereafter can be recycled to the first leach reactor, thus reducing the amount of fresh HCl required, and minimizing the costs of the method.

Typically, the temperature of the slurry is kept higher than 65° C., preferably between 80 and 100° C. Heating is generally not required since the leaching reaction is highly exothermic. But if the initial temperature is lower than 65° C., an external heating source will be required to effectively initiate the autogenous reaction. The first leach step usually allows the extraction of about 65–85% of the magnesium. In a preferred embodiment, in order to maximize the extraction of magnesium, the slurry is transferred by gravity to a second leaching reactor wherein the leach reaction can be completed. It has been found that a retention time of about 1 hour in each leaching reactor is sufficient to recover substantially all extractable magnesium, although shorter retention times are possible since the magnesium chlorination reaction and subsequent dissolution of magnesium chloride is extremely rapid.

Although 2 leaching reactors in series are usually adequate, depending on the nature of the magnesium-containing material, it may be necessary to either extend the retention times in each leaching reactor or add one or more reactors, which would also extend the retention time, to maximize the recovery of magnesium by allowing completion of the leach reaction.

Similarly for the neutralization stages, the preferred series comprises 3 separate neutralizing stages. Anyone of ordinary skill in the art could easily add further stages to the series, if desired, to allow completion of the reaction in each stage. However, because of obvious capital costs associated with additional reactors and the requirement of further floor space, it has been found that a series of 3 neutralization stages is optimal.

As it can be seen from the above chemical formulae, the starting materials suitable for the purposes of the present method contain several metals in addition to magnesium. They also generally contain small concentrations of other base metals impurities like nickel, manganese, chromium, copper, cobalt etc. In addition, iron is present in both the ferrous (+2) and ferric (+3) state. During the leaching of silicate materials, magnesium as well as most of the metals and base metals impurities present are extracted and report to the leaching solution. It is therefore necessary to remove all these contaminants in the leach solution to obtain a substantially pure magnesium chloride solution. Such removal is performed through a series of neutralization steps wherein the contaminants are removed by precipitation in the form of oxides and hydroxides.

The description of the neutralizing steps provided hereunder refers to general conditions found to be acceptable when the starting material is serpentine. The experimental parameters expressed may vary depending on the starting material, but anyone of ordinary skill in the art will be able to optimize these parameters if necessary without undue experimentation. Reference will also be made to FIG. 1 to better illustrate the method.

Throughout the description, reference will be made to the use of oxidants and bases in the neutralization steps to control the oxydo-reduction potential (ORP) and the pH respectively. Basically any type of oxidant or base can be used for the purposes of the present method, preferred oxidants and bases obviously being those that do not introduce significant concentrations of contaminants in the slurry. Most preferred oxidants include hypochlorites, chlorites and chlorates of magnesium, sodium and calcium, hydrogen peroxide, chlorine, ozone or mixtures thereof. Most preferred bases include oxides or hydroxides of magnesium and calcium, or mixtures thereof. In addition, the pH values provided are the values measured within the temperature ranges specified in the application with a pH meter model T21 manufactured and sold by Electro-Chemical Devices Inc. All the potential values are based on Ag/AgCl electrodes also manufactured and sold by Electro-Chemical Devices Inc. It is possible that the pH and potential values may vary if the pH meter and the potential electrodes used are different from those specified in the present application. One should therefore take the necessary steps to obtain corresponding values from the equipment used to avoid discrepancies in the method.

The slurry produced after the leaching steps in leaching reactors 10 and 12 is transferred in a first neutralization reactor 14 wherein the pH is maintained between about 0.5 and about 3.5 by addition of a base, while the potential of the slurry is preferably maintained between +0 and +350 mV. The natural potential of the slurry should be adjusted around 500 mV at the end of the leaching steps as measured by the Ag—AgCl electrode, to ensure that the iron is in the ferric state. However, during this first neutralization, the precipitation of iron drops the potential, and in order to maintain it around +0 and +350 mV, an oxidant has to be added or sparged in neutralization reactor 14 to maintain the potential between the said values. Under these conditions, most of the base metals and iron in the ferric state, precipitate.

The slurry is then transferred to a second neutralization reactor 16 wherein the pH is raised to about 4 to 5.5 by adding a base. As a result, most of the remaining iron will precipitate, as well as some nickel, if any is still present. The potential is preferably maintained between −300 and +300 mV, for example by adding an oxidant.

The slurry is transferred in a third neutralization reactor 18 wherein the potential is raised above +450 mV, and preferably between +700 to +800 mV, by adding an oxidant to oxidize and precipitate manganese in the form of manganese dioxide. The pH is maintained over about 4 but should not exceed 6, otherwise hydrochloride formation occurs and the slurry "freezes".

Finally, the slurry is submitted to a solid/liquid separation step to recover a substantially pure magnesium chloride solution containing 1 ppm or less of any contaminant present in the solution. The magnesium chloride recovered from the present method is sufficiently pure to be used as the starting material in the production of pure magnesium metal. The solid liquid separation step may be carried out in various ways, for example, by filtration, gravity, decantation etc., the most preferred one being vacuum filtration.

The retention time in each of the 3 neutralization reactors is typically 1 hour. However, anyone skilled in the art may increase or decrease the retention time in each reactor depending on, for example, the experimental conditions applied and the nature of the magnesium-containing material.

The transfer of the slurry between the stages above can be done in various manners. For practical and economical reasons, transfer by gravity is most preferred. The method can be carried out batchwise, but for obvious commercial application, it is much preferred to carry it out in a continuous manner.

The invention will now be illustrated by the following examples, which are provided for illustration purposes, and shall not be considered as limiting its scope. Since the method is carried out in a continuous manner, the values provided in the examples are mean values. For the 3 examples, a cascade of five 380 liters reactors was used, the first two for leaching and the subsequent 3 for neutralization.

EXAMPLE 1

This example shows that when all the requirements of the present method are met, a substantially pure magnesium chlorine solution containing 1 ppm or less of any contaminant present in the solution can be achieved.

Serpentine tailings (composition: 23% Mg; 5% Fe; 0.0593% Mn and 0.21% Ni) were added continuously at a rate of 140 kg/h to the first leaching reactor. Concentrated hydrochloric acid (33%), recycled hydrochloric acid (4–7%) and recycled wash water (30–60 g/l Mg) were also continuously added in the first reactor at a flow rate of 218 l/h, 56 l/h and 100 l/h respectively. About 68% of the magnesium was extracted after the first leach reactor and 72% after the second leach reactor. The total retention time for both reactors was 120 minutes. Temperature was 80° to 85° C. in the leach reactors with no heating. A magnesium oxide slurry (30% by weight) was added to the first neutralization reactor along with chlorine gas to maintain the pH at 1.8 and the potential at +199 mV (Ag—AgCl). Further chlorine was added to oxidize ferrous iron to ferric iron. A magnesium oxide slurry (30% by weight) was also added to the second neutralization reactor to maintain the pH 4.6 while the potential dropped to +110 mV. In the third neutralization reactor, chlorine gas was sparged to raise the potential higher than +650 mV and precipitate manganese in the form of manganese dioxide. The pH remained at 4.6 in last reactor. Over several operating days, an average concentration of 87 g/l Mg (341 g/l MgCl$_2$) was obtained in the solution from the third neutralization reactor. Average concentrations of <0.3 ppm Fe; <0.7 ppm Mn and <0.5 ppm Ni were achieved for several consecutive days. Temperature was between about 90° to 100° C. in the neutralization reactors.

EXAMPLE 2

In this example, it is shown that inappropriate potential values in the third neutralization step cause the concentration of manganese to be significantly higher than 1 ppm.

Serpentine tailings (composition: 23% Mg; 5% Fe; 0.0593% Mn and 0.21% Ni) were added continuously at a flow rate of 165 kg/h to the first leaching reactor. Under these conditions, the circuit was operated at 120% of its nominal flow. Concentrated hydrochloric acid (33%), recycled hydrochloric acid (4–7%) and recycled wash water (30–60 g/l Mg) were also continuously added in the first reactor at a flow rate of 263 l/h, 56 l/h and 133 l/h respectively. The total retention time for both leach reactors was 100 minutes. Magnesium extractions were 68% after the first reactor and 74% after the second leach reactor. A magnesium oxide slurry (30% by weight) was added to the first neutralization reactor along with chlorine gas to maintain the pH at 1.7 and the potential at about +246 mV (Ag—AgCl). Further chlorine was added to oxidize iron to the ferric state. A magnesium oxide slurry (30% by weight) was also added to the second neutralization reactor to maintain the pH 4.6 while the potential dropped to about +159 mV. In the third neutralization reactor, chlorine gas was sparged to raise the potential to >+650 mV and precipitate manganese dioxide. However, throughout the time of the trial, the average potential in the third neutralization reactor was only about 585 mV. The final solution out of the third neutralization reactor contained on average 87.7 g/l Mg (27.5% $MgCl_2$). The temperature was from about 91° to 101° C. in neutralization reactors. Average concentrations of <0.3 ppm Fe; 35 ppm Mn and <0.9 ppm Ni were achieved. This confirms that if the potential is not properly controlled, as in Example 1, manganese removal is not effective.

EXAMPLE 3

This example describes the results obtained when some parameters of the present method are not within the required ranges. As shown, the concentrations of nickel and iron are higher than 1 ppm when inappropriate pH and potential values are used.

The leach process was operated using an acid/ore ratio of 0.73 while all other experimental conditions were kept the same as in examples 1 and 2 above. Serpentine tailings (composition: 22.8% Mg; 8.1% Fe; 0.0516% Mn and 0.21% Ni) were added continuously at a flow rate of 146 kg/h to the first leach reactor along with 240 l/h of 33% hydrochloric acid, 75 l/h of 4–7% recycled HCl, and 82 l/h of recycled wash water assaying 30–60 g/L Mg. About 71% of the magnesium was extracted after the first leach reactor, and about 81% after the second leach reactor. The magnesium concentration in the solution of the last neutralization reactor averaged 91.5 g/l (28.7% $MgCl_2$). Average concentrations of 1.5 ppm Fe, 0.2 ppm Mn and 3.0 ppm Ni were achieved. The higher iron and nickel concentrations in the final solution are explained by the following. In the first neutralization reactor, the pH varied from 0.9 to 2, and the lower pH values caused higher iron levels in first and second neutralization reactors resulting in higher level of nickel. The potential in the first neutralization reactor averaged +350 mV, a value which is too high to obtain rapid and efficient impurity removal, the preferred potential being between about +0 and about +250 mV.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features herein before set forth, and as follows in the scope of the appended claims.

What is claimed is:

1. A method for the extraction of magnesium from a magnesium-containing material, the method comprising the steps of:
    a) feeding the magnesium-containing material and hydrochloric acid in a first leaching reactor to produce a slurry wherein the magnesium solubilizes in the form of magnesium chloride, the magnesium-containing material and the hydrochloric acid being fed at a rate such that an excess of acid is maintained in the slurry solution, the temperature in the reactor being maintained sufficiently high to initiate an autogenous reaction solubilizing magnesium;
    b) carrying a first neutralization stage in a first neutralization reactor by transferring the slurry from the first leaching reactor to the first neutralization reactor wherein the pH is raised to between substantially 0.5 and substantially 3.5 under a positive potential of from substantially +0 to substantially +250 mV;
    c) carrying a second neutralization stage in a second neutralization reactor by transferring the slurry from the first neutralization reactor to the second neutralization reactor wherein the pH is raised to between substantially 4.0 and substantially 5.5 while maintaining a potential between substantially −300 mV and substantially +300 mV;
    d) carrying a third neutralization stage in a third neutralization reactor by transferring the slurry from the second neutralization reactor to the third neutralization reactor wherein the potential is raised to a value higher than +650 mV; and
    e) submitting the slurry produced after step d) to a solid/liquid separation step to recover a substantially pure magnesium chloride solution comprising 1 ppm or less of each contaminant present therein.

2. A method according to claim 1 wherein the potential in the first neutralization reactor is from substantially +0 to substantially +199 mV.

3. A method according to claim 1 wherein the magnesium-containing material is magnesite, dolomite, a magnesium-containing silicate material, oxides thereof, or mixtures thereof.

4. A method according to claim 1 wherein the hydrochloric acid is added in the form of an aqueous solution, a gas, or mixtures thereof.

5. A method according to claim 1 wherein the potential is adjusted is steps b), c) and d) by adding an oxidant into the neutralization reactor.

6. A method according to claim 5 wherein the oxidant is hypochlorites, chlorites or chlorates of sodium, magnesium or calcium, hydrogen peroxide, chlorine gas, ozone, or mixtures thereof.

7. A method according to claim 1 wherein the slurry is transferred from a reactor to another by gravity.

8. A method according to claim 1 wherein after step a), the slurry is transferred into a second leach reactor to allow completion of the leach reaction.

9. A method according to claim 3 where the magnesium-containing silicate material is serpentine residues.

10. A method for the extraction of magnesium from serpentine residues, the method comprising the steps of:
    a) feeding the serpentine residues and a concentrated hydrochloric acid solution in a first leaching reactor to produce a slurry wherein the magnesium solubilizes, the serpentine residues and the hydrochloric acid being fed at a rate such that an excess of acid is maintained in the solution, the temperature in the reactor being maintained sufficiently high to initiate an autogenous reaction solubilizing magnesium;

b) transferring the slurry by gravity from the first leaching reactor to a second leaching reactor to allow completion of the leach reaction;

c) carrying a first neutralization stage by transferring the slurry by gravity from the second leaching reactor into a first neutralization reactor wherein the pH is raised to between substantially 0.5 and substantially 3.5, and the potential is maintained between substantially +0 to substantially +250 mV by adding an oxidant;

d) carrying a second neutralization stage by transferring the slurry by gravity from the first neutralization reactor into a second neutralization reactor wherein the pH is raised to substantially 4 to substantially 5.5 while maintaining a potential of from substantially −300 mV to substantially +300 mV by adding an oxidant;

e) carrying a third neutralization stage by transferring the slurry by gravity from the second neutralization reactor into a third neutralization reactor wherein the potential is raised at a value higher than +650 mV by adding an oxidant; and f) submitting the slurry produce after step e) to a solid/liquid separation step to recover a substantially pure magnesium chloride solution containing 1 ppm or less of each contaminant present therein.

11. A method according to claim 10 wherein the oxidant is hypochlorites, chlorites or chlorates of sodium, magnesium and calcium, hydrogen peroxide, chlorine gas, ozone, or mixtures thereof.

* * * * *